June 18, 1968     W. O. NELSON     3,388,617
AUTOMATIC VARIABLE SPEED BICYCLE TRANSMISSION
Filed Oct. 4, 1962     8 Sheets-Sheet 1
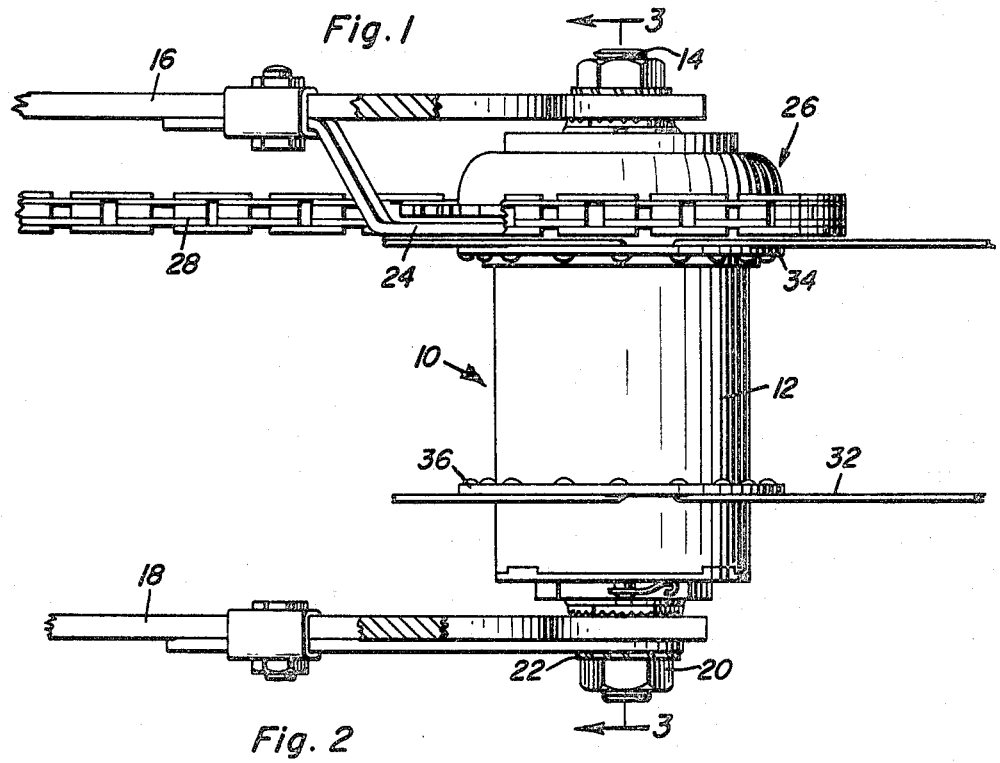
William O. Nelson
INVENTOR.

June 18, 1968     W. O. NELSON     3,388,617
AUTOMATIC VARIABLE SPEED BICYCLE TRANSMISSION
Filed Oct. 4, 1962     8 Sheets-Sheet 2
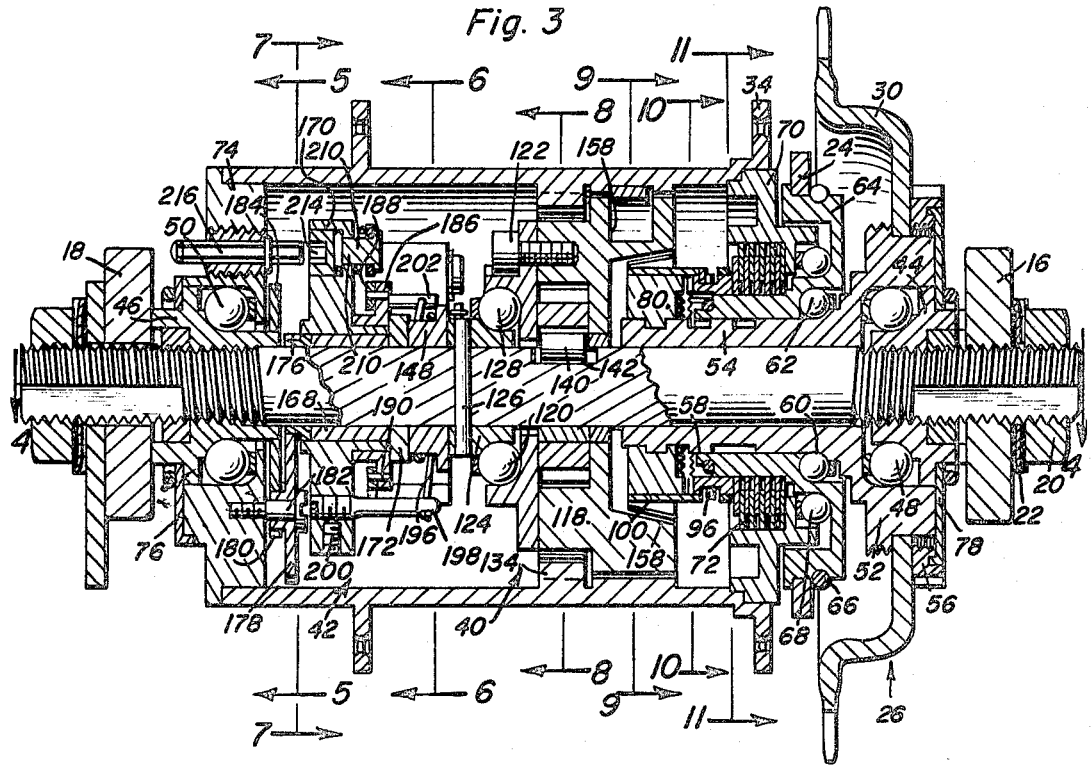
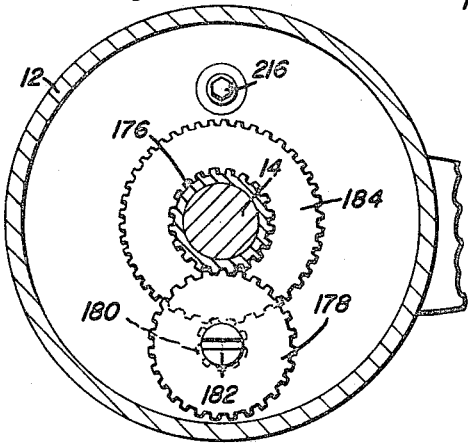
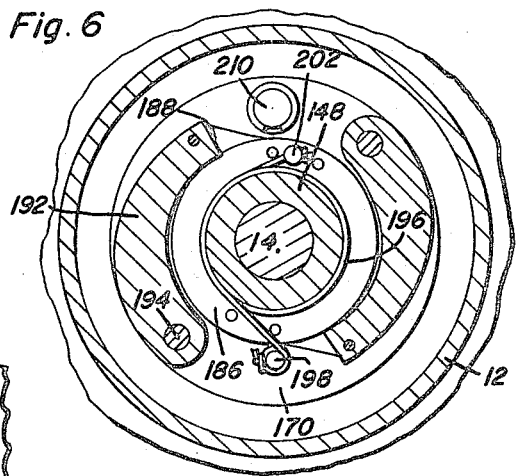
William O. Nelson
INVENTOR.

June 18, 1968 W. O. NELSON 3,388,617
AUTOMATIC VARIABLE SPEED BICYCLE TRANSMISSION
Filed Oct. 4, 1962 8 Sheets-Sheet 3
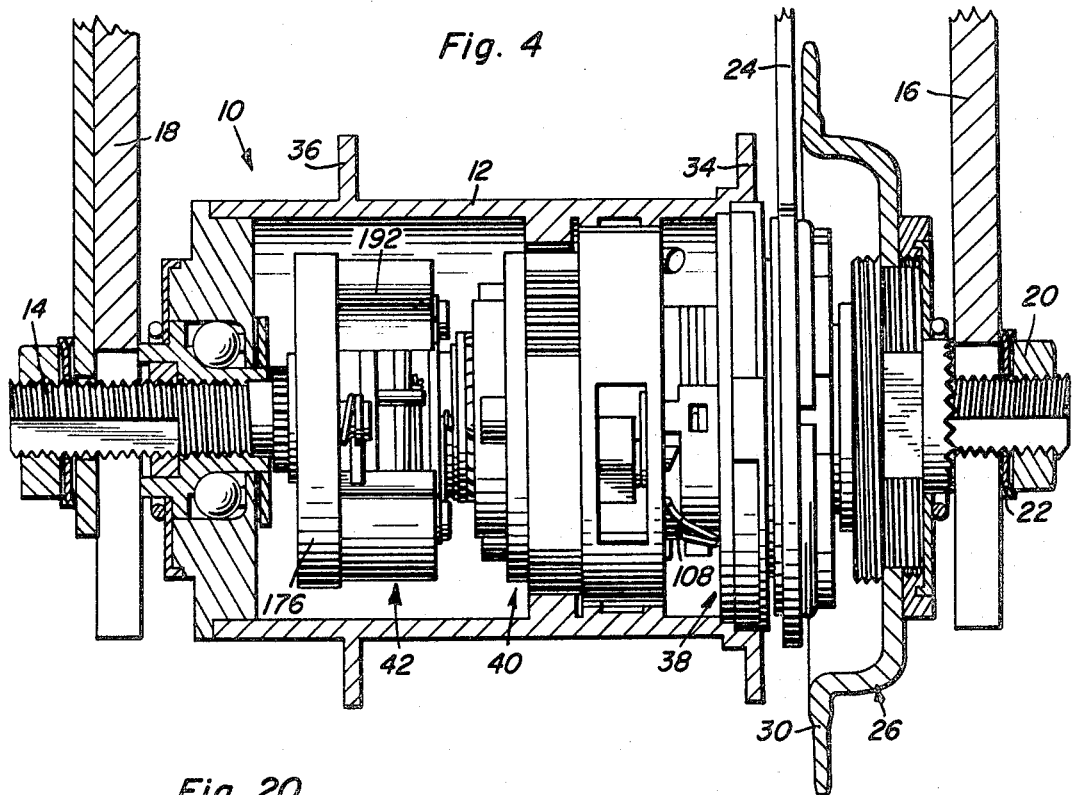
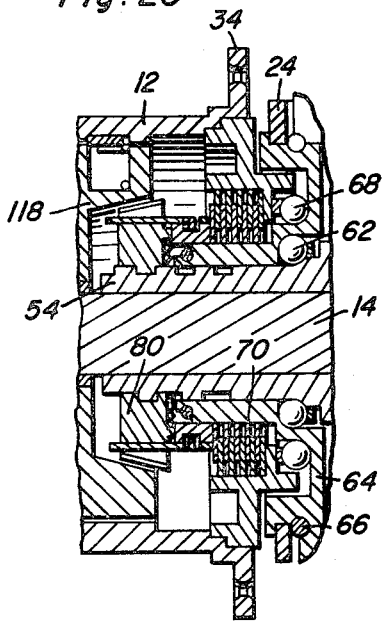
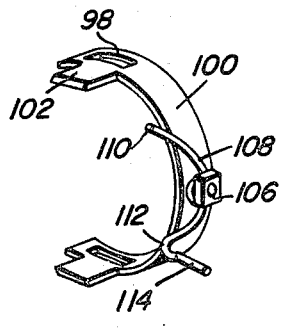
William O. Nelson
INVENTOR.

June 18, 1968 W. O. NELSON 3,388,617
AUTOMATIC VARIABLE SPEED BICYCLE TRANSMISSION
Filed Oct. 4, 1962 8 Sheets-Sheet 4
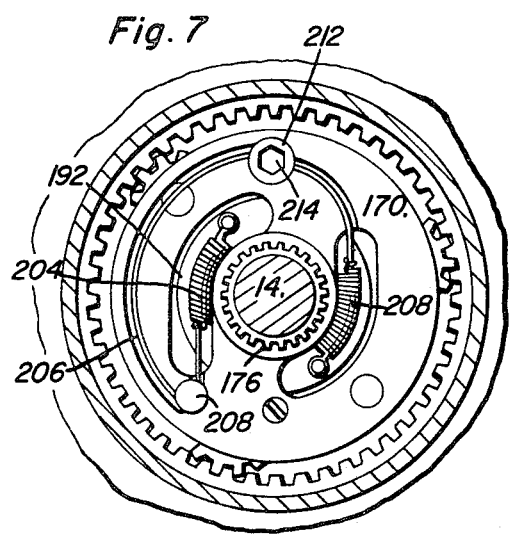
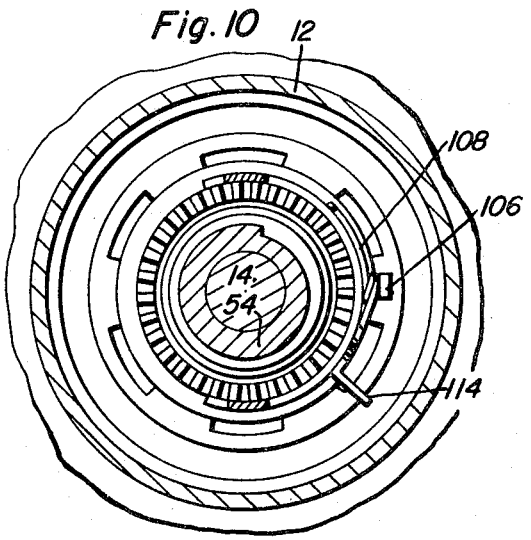
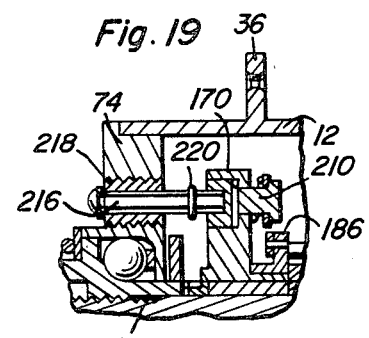
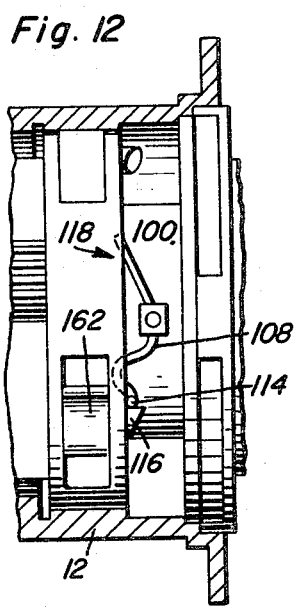
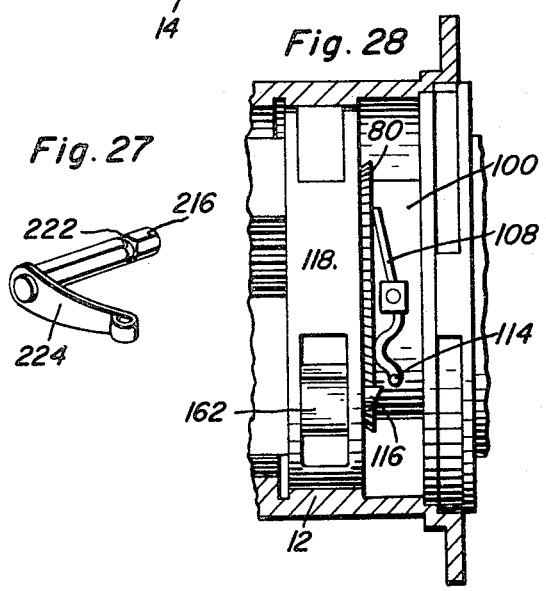
William O. Nelson
INVENTOR.

June 18, 1968  W. O. NELSON  3,388,617
AUTOMATIC VARIABLE SPEED BICYCLE TRANSMISSION
Filed Oct. 4, 1962  8 Sheets-Sheet 5

William O. Nelson
INVENTOR.

BY *Clarence A. O'Brien*
and *Harvey B. Jacobson*
Attorneys

June 18, 1968  W. O. NELSON  3,388,617
AUTOMATIC VARIABLE SPEED BICYCLE TRANSMISSION
Filed Oct. 4, 1962  8 Sheets-Sheet 6

William O. Nelson
INVENTOR.

BY *Clarence A. O'Brien*
and *Harvey B. Jackson*
Attorneys

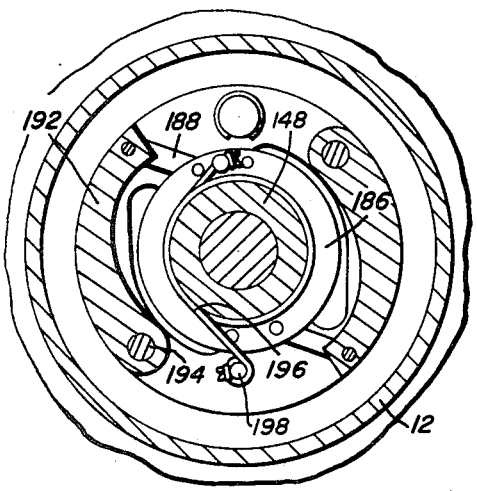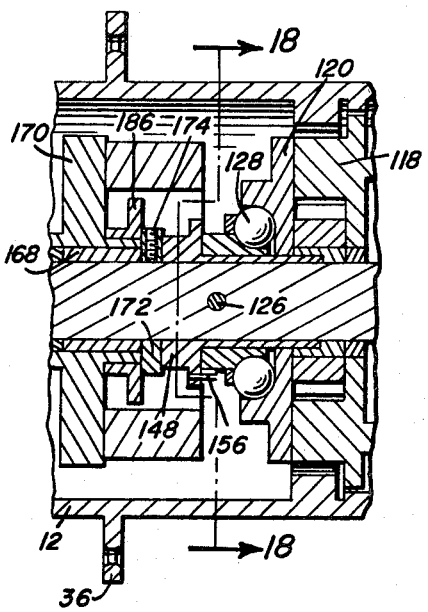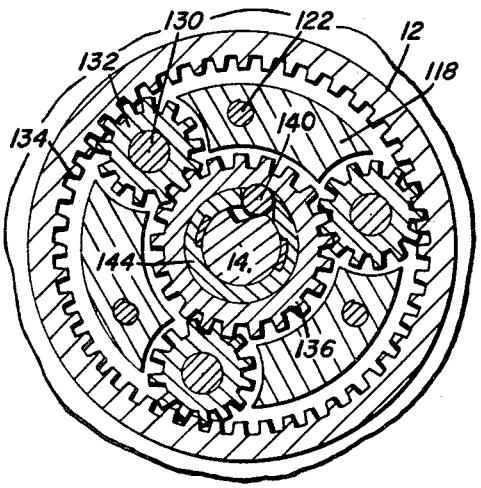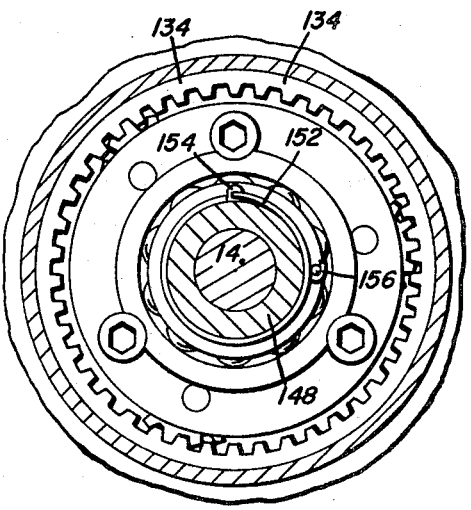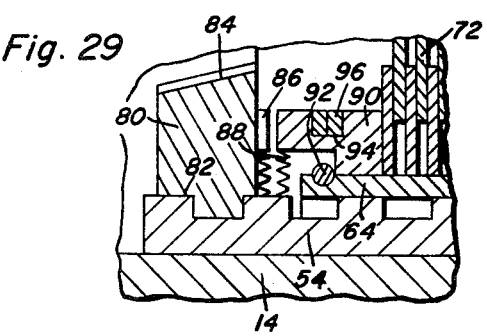
William O. Nelson
INVENTOR.

June 18, 1968 W. O. NELSON 3,388,617
AUTOMATIC VARIABLE SPEED BICYCLE TRANSMISSION
Filed Oct. 4, 1962 8 Sheets-Sheet 8

William O. Nelson
INVENTOR.
BY
Attorneys

United States Patent Office 3,388,617
Patented June 18, 1968

3,388,617
AUTOMATIC VARIABLE SPEED BICYCLE
TRANSMISSION
William O. Nelson, Sarasota, Fla., assignor to
Blanche G. Nelson, Sarasota, Fla.
Filed Oct. 4, 1962, Ser. No. 228,402
23 Claims. (Cl. 74—752)

This invention relates to a plural speed transmission, the drive ratio of which is automatically changed in accordance with the output speed of the transmission and under control of the input driving torque. More particularly, the transmission of the present invention relates to an automatic two-speed drive for bicycles, associated with the axle mounted, back-pedaling coaster brake hub.

Plural speed bicycle transmissions of the type referred to, have heretofore required manually shiftable means for changing the drive ratio as part of either a drive ratio preselecting mechanism or as a direct control mechanism. Drive ratio changing or control have also been attempted by back-pedaling operation of the input sprocket assembly, which has however required elimination of the back-pedaling coaster brake associated with the coaster brake hub. It is therefore a primary object of the present invention to provide a two speed bicycle transmission associated with a back-pedaling coaster brake assembly yet operative without any manual control to effect automatic change in the drive ratio between the input sprocket assembly and the driven hub as well as to effect back pedal braking under the most favorable conditions therefor.

Another object of the present invention is to provide an automatically operative change speed transmission for bicycles, the automatic operation of which may be readily adjusted in accordance with any preselected speed, or adjusted for single speed operation at any one of its available speed ratios.

An additional object of the present invention is to provide an automatically operative change speed transmission for bicycles, in which a change in speed ratio is effected under preselected speed conditions, by the mere removal of the driving torque from the input sprocket assembly for down shifting purposes and without interruption of driving torque for upshifting purposes. Manual control operation and apparatus in connection therewith is hereby eliminated.

A still further object of the present invention is to provide an automatically operative change speed bicycle transmission which features a clutch mounted retarding assembly and operative in response to coast operation to retard one element of the driving gear train so as to assist down shift of the transmission to a lower speed ratio and thereby also condition the gear train for any subsequent back-pedaling braking operation. Thus, braking is effected only in the low speed ratio condition.

Yet another object of the present invention is to provide an automatically operative change speed transmission for bicycles which features a speed responsive release mechanism operative by a reduced amount of torque applied thereto from the driven hub to hold the transmission in a lower drive ratio below a preselected speed and operative above said preselected speed, to release the transmission gearing for overdrive operation under the impetus of the driving torque on the input sprocket assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the bicycle transmission of the present invention shown installed in a typical bicycle environment.

FIGURE 2 is an end elevational view of the transmission assembly and installation illustrated in FIGURE 1.

FIGURE 3 is a longitudinal sectional view taken through the transmission assembly as indicated by section-line 3—3 in FIGURE 1 the transmission being illustrated in a neutral or coasting condition.

FIGURE 4 is a side elevational view of the transmission with the enclosing hub and portions of the input drive sprocket assembly shown in section.

FIGURES 5, 6, 7, 8, 9, 10 and 11 are transverse sectional views taken through the transmission as indicated by transverse sectional lines in FIGURE 3.

FIGURE 12 is a partial top view of the retarding assembly portion of the transmission within the section hub.

FIGURE 15 is a transverse sectional view similar to that of FIGURE 6 but illustrating the speed responsive release mechanism above a preselected speed condition of the transmission.

FIGURE 16 is a partial longitudinal sectional view of the speed responsive release mechanism portion of the transmission corresponding to the condition referred to with respect to FIGURE 15.

FIGURE 17 is a transverse sectional view similar to that of FIGURE 8 but illustrating the driving gear train in an overdrive condition.

FIGURE 18 is a transverse sectional view taken substantially through a plane indicated by section line 18—18 in FIGURE 16.

FIGURE 19 is a partial longitudinal sectional view of speed selecting mechanism in an engaged condition.

FIGURE 20 is a partial longitudinal sectional view of a portion of the transmission in a coast braking condition.

FIGURE 21 is a perspective view of the clutch disk mounted retarding assembly.

FIGURE 27 is a perspective view of the speed selecting adjusting element.

FIGURE 28 is a partial top plan view similar to that of FIGURE 12, illustrating the retarding assembly in inoperative position.

FIGURE 29 is a partial sectional view taken substantially through a plane indicated by section line 29—29 in FIGURE 11.

Figure 8:
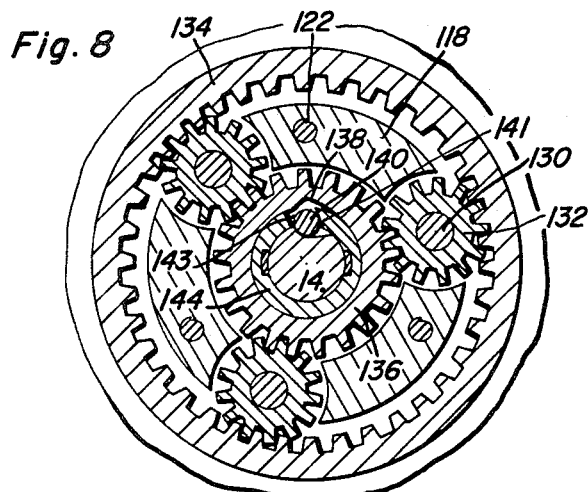

Referring to FIGURES 1, 2 and 4 initially, it will be observed that the bicycle transmission generally referred to by reference numeral 10 is mounted within the usual back-pedaling coaster brake hub 12 rotatably carried by the stationary axle 14 of the rear bicycle wheel assembly, the axle being mounted in a stationary condition on the bicycle frame by the rearwardly extending bicycle frame members 16 and 18 held on threaded end portions of the axle 14 by the lock nuts 20 and lock washers 22. Also clamped to the frame member 16, is the spaced frame element 24 for mounting the input drive sprocket assembly 26 in axial position on the stationary axle 14. The driving sprocket chain 28 is therefore entrained about the sprocket gear portion 30 of the input sprocket assembly 26 by means of which the bicycle rider may impart forward driving torque to the drive sprocket assembly, to hold the drive sprocket assembly stationary or impart reverse braking torque by back-pedaling in a manner well known to those skilled in the art. Accordingly, rotation is imparted to the driven hub 12 or braking torque applied thereto in order to propel the bicycle or stop the bicycle. The rear wheel assembly of the bicycle is therefore connected to the driven hub 12 by means of spokes 32 anchored to annular flange portions 34 and 36 which are secured to the driven hub 12. The driven hub 12 therefore mounts internally therewithin, a backpedaling coaster brake assembly generally referred to by reference numeral 38 located adjacent the right axial end of the driven hub as viewed in FIGURE 4, a planetary drive assembly 40 through which a direct and an overdrive is established between the input drive assembly 26 and the hub and a speed responsive release mechanism generally referred to by reference numeral 42 through which speed responsive control is exercised over the drive condition of the planetary drive assembly 40.

Figure 23:
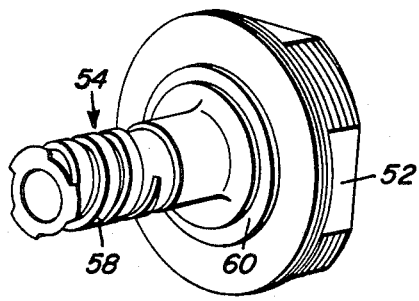
FIGURE 23 is a perspective view of a portion of the sprocket drive assembly.
Figure 24:
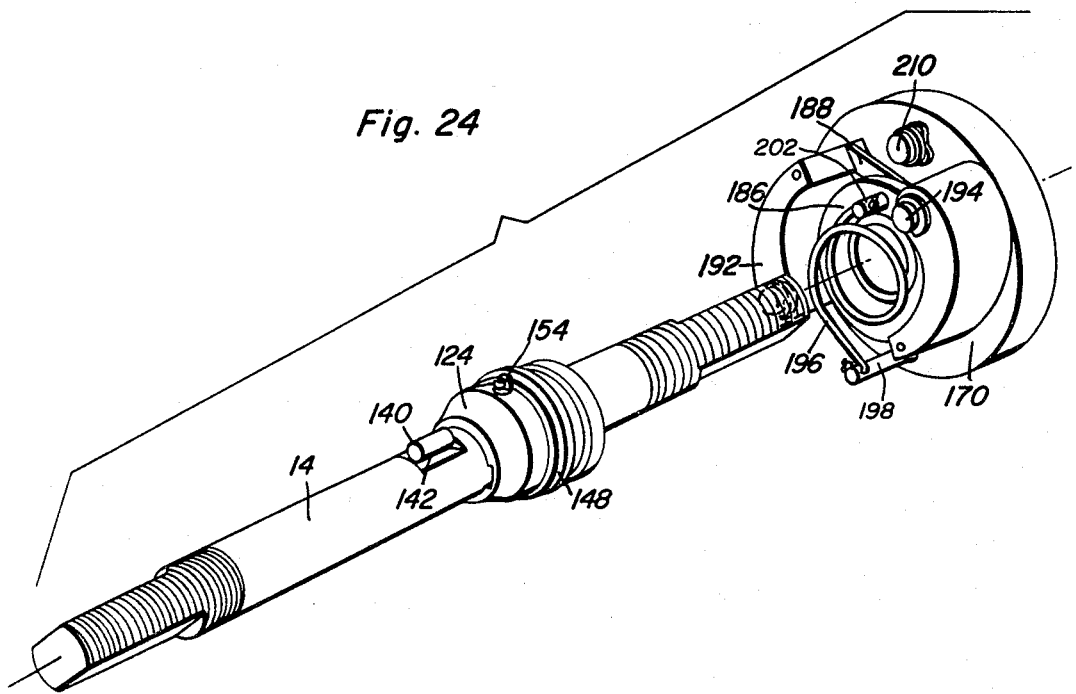
FIGURE 24 is a perspective view of the stationary axle assembly and speed responsive release mechanism shown in disassembled condition.
Figure 25:
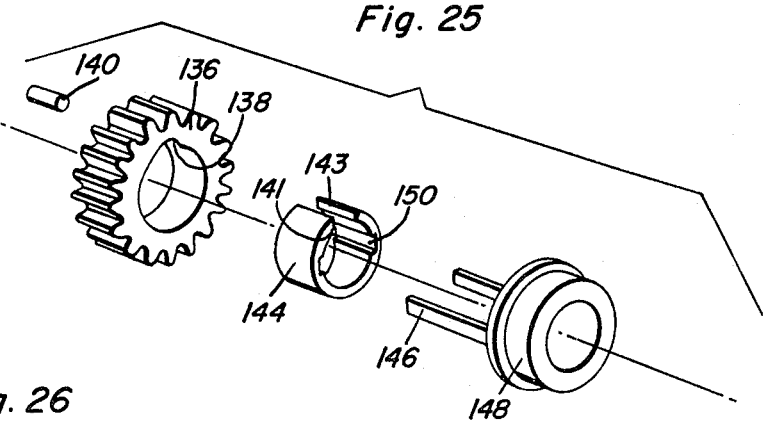
FIGURE 25 is a perspective view illustrating the disassembled parts of the releasable brake assembly and reaction gear element of the planetary drive assembly on which the brake assembly is operative.
Figure 26:
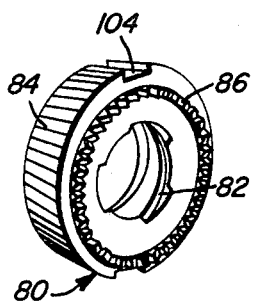
FIGURE 26 is a perspective view of the clutch disk and coast brake actuating member.

Referring now to FIGURE 3 in particular, it will be observed bearing ring members 44 and 46 are threadedly mounted on the threaded end portions of the axle 14 in locked axial position against the frame members 16 and 18 forming internal races for the ball bearing elements 48 and 50 respectively. Journaled by means of the ball bearing 48, is the input drive sprocket assembly 26 having an enlarged diameter end portion 52 on which the sprocket gear 30 is mounted and held in assembled position by means of the lock ring 56. Extending from the enlarged diameter portion 52 in an axial direction, is an axially elongated screw shaft portion 54 having external left handed actuating threads 58 as more clearly seen in FIGURE 23. The intermediate portion 60 of the input drive assembly forms a ball bearing race for the bearing 62 cooperating with the internal race formed in the brake hub member 64 to which the frame element 24 is secured and held in axial locked position by the annular ring element 66. The ball bearing elements 68 supported on the brake hub member 64 form an axial thrust assembly supporting the rotatable brake member 70 of the back-pedaling coaster brake assembly 38 which cooperates with the frame mounted brake hub member 64 in order to retard rotation of the hub 12 to which the member 70 is connected at one axial end. Accordingly, interleaved brake disks 72 are carried on radially confronting spines formed externally and internally on the brake hub member 64 and rotatable brake member 70 respectively. Thus, it will be apparent that the right axial end of the hub 12 will be rotatably supported on the axle with facilities for resisting axial thrust. The left axial end of the hub 12 as viewed in FIGURE 3 is rotatably supported on the ball bearing element 50 by means of an end cover member 74 secured thereto and provided with an internal race. A dust cover element 76 is secured to the axial outer end of the end cover member 74 while a dust cover member 78 is secured to the lock ring 56 on the drive sprocket assembly. The foregoing description of the back-pedaling coaster brake hub mounting and associated coaster brake and drive sprocket assembly, represents a commonly known mounting arrangement for coaster brake hubs. However, the mechanism and the arrangement of parts within the driven hub differs from arrangements hereinbefore known so as to produce the results and operation hereinbefore mentioned in a smoothly operating manner.

*Clutch disk and brake engaging assembly*

Referring now to FIGURES 3, 11, 29 and 26 in particular, it will be observed that a clutch disk member 80 is mounted at one axial end of the externally threaded portion 54 of the input drive assembly 26. The clutch member 80 is therefore provided with internal spiral grooves 82 for threadedly mounting the clutch disk member on the externally threaded portion 54 in order to produce axial movement of the clutch disk member in response to relative rotation between the drive sprocket assembly and the clutch disk member. An external bevel engaging surface 84 is formed on the clutch disk member so that when it is axially displaced toward the left as viewed in FIGURE 3, it will engage the planetary drive assembly 40 to impart driving torque thereto. Driving torque is of course derived from the input drive sprocket assembly 26 when rotatively locked to the clutch member 80 at the axial end of its movement. Thus, forward driving torque applied to the drive sprocket assembly will be operative through the external threads 58 thereof to axially displace the clutch member 80 into driving engagement in order to impart clockwise rotation thereto at the end of its movement as viewed from the right end of the transmission in FIGURE 3. In response to counter-clockwise rotation of the input sprocket assembly by back-pedaling, the external threads 58 thereon will be operative to impart axial movement to the clutch member 80 in a clutch disengaging direction or to the right as viewed in FIGURE 3 so as to cause the axially projecting teeth 86 thereon to engage the axial teeth 88 on an annular brake actuating element 90 which is rotatably mounted on an axially projecting portion of the stationary brake hub member 64. An annular retaining ring 92 holds the brake actuating member 90 in axial position against the interleaved brake disks 72. It will therefore be apparent, that the clutch disk member 80 when being displaced axially in a clutch disengaging direction, will initially engage the brake actuating member 90 and then apply axial pressure for packing the brake disks in order to retard rotation of the movable brake member 70 connected to the driven hub 12.

Figure 22:
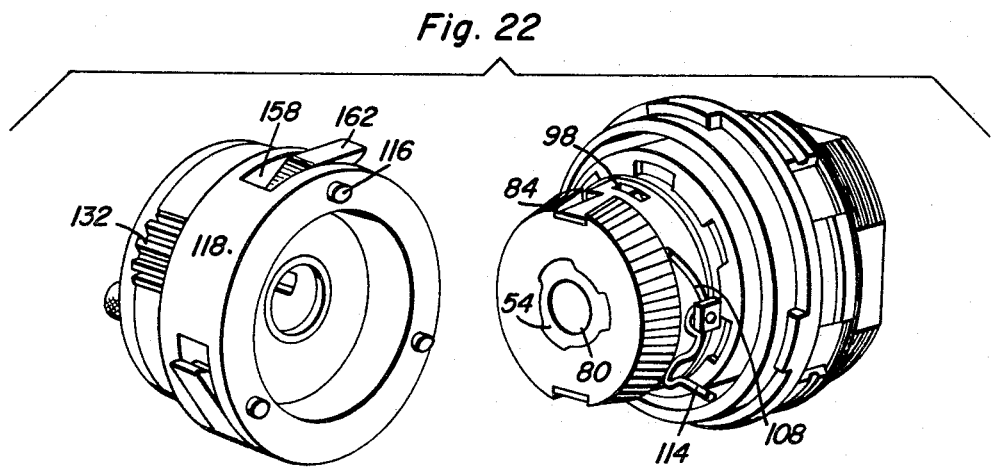
FIGURE 22 is a perspective view of the clutch and brake assembly and planetary drive assembly shown in disassembled condition.

The brake actuating member 90 is provided with an annular groove 94 within which retaining spring elements 96 are seated and adapted to be received within slots 98 of a retarding coupling element 100 forming part of a retarding assembly as more clearly seen in FIGURE 21. Accordingly, limited angular displacement between the coupling element 100 and the brake actuating member 90 is accommodated, the coupling element 100 being provided with axially projecting portions 102 which are received within slots 104 of the clutch disk member so that the retarding assembly will rotate with the clutch disk member yet be held in axial position relative thereto by the retaining spring elements 96 which project into the slots 98. Mounted in axially fixed position on the coupling element 100 by the tension adjusting element 106 is a retarding spring element 108 including end 110 and a curved bent portion 112 which are adapted to bear against the rear face of the clutch disk member 80 as more clearly seen in FIGURE 22.

The retarding spring element 108 is also provided with a radially projecting end portion 114, the axial position of which is shifted from the position illustrated in FIGURE 12 to the position illustrated in FIGURE 28 in response to axial movement of the clutch disk member 80 to the coast brake engaging position. In this manner, the radially projecting portion 114 is displaced out of the path of a plurality of projecting pins 116 formed on a planetary gear carrier or cage member 118 of the planetary drive assembly 40. Also, the direction in which axial thrust is applied to engage the disc brake will avoid axial loading in the hub bearing 50 for smoother disc engagement.

Planetary drive assembly

As more clearly seen in FIGURES 3 and 8, the planetary gear assembly 40 is supported by means of the transmission cage member 118 for rotation about the stationary axle 14. The cage member 118 therefore has secured thereto, a bearing race element 120 by means of a plurality of fasteners 122. The bearing element 120 is therefore disposed in axial thrust relationship to the fixed bearing member 124 secured by the pin 126 to the stationary axle 14 so as to resist axial thrust of the planetary drive assembly and provide rotatable support therefor through the ball bearing 128. The cage member 118 is also provided with a plurality of journal shafts 130, rotatably mounting planet pinions 132 that mesh respectively with an internal ring gear formation 134 on the driven hub 12 and a reaction sun gear 136 coaxially aligned therewith. The reaction sun gear 136 is provided with an internal cam groove 138 forming of a releasable brake assembly. As more clearly seen in FIGURES 8, 17, 24 and 25, rotation of the sun gear 136 in one direction will be operative to displace a one-way brake roller element 140 into wedging engagement between the internal cam groove 138 and a roller containing recess 142 formed in the stationary axle member 14 properly positioning the sun gear.

Thus rotation of the sun gear 136 in a clockwise direction as viewed in FIGURE 8 will be prevented after the brake roller 140 is displaced clockwise by the cam groove 138 relative to the roller containing pocket recess 142. However, the brake roller may be held depressed in unlocked or release position by the camming face 141 of a split change speed ring element 144 effective to radially cam the roller 140 inwardly into the recess 142 in a counter-clockwise direction. Angular shifting of the ring 144 for such purpose is effected by brake disengaging fingers 146 connected to a brake control sleeve 148, said fingers being received within recesses 150 in the split ring 144. The brake controlling ring 144 and sun gear are otherwise normally urged to the brake engaging position as illustrated in FIGURE 17 by means of a spring element 152, one end of which is anchored to a radially projecting end 154 of the pin 126, the other end of said spring being engaged about an anchor pin 156 on the control sleeve 148 as more clearly seen in FIGURE 18. It will therefore be appreciated, that under the bias of the spring 152, the brake roller 140 will be cammed radially outwardly by the roller engaging face 143 into the cam groove 138 when the sun gear is properly oriented so that rotative torque imparted to the cage 118 in a clockwise direction will tend to impart rotation in a clockwise direction to the ring gear 134 which is connected to the hub, at an overdrive ratio. The ring 144 is purposely split so that it may easily deform under load rather than rupture as in the case of a solid ring. The ring may therefore effectively function to properly hold the sun gear groove 138 in the brake engaging position to condition the planetary assembly for high ratio operation as well as to hold the roller depressed in the axle recess 142 in the low ratio condition, then acting as a sleeve bearing for the sun gear.

Figure 9:
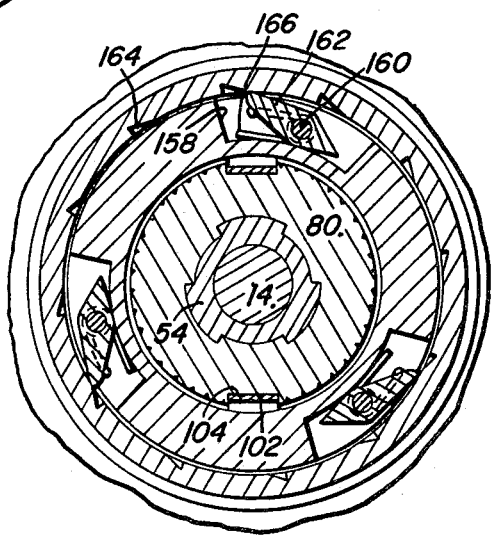
Figure 11:
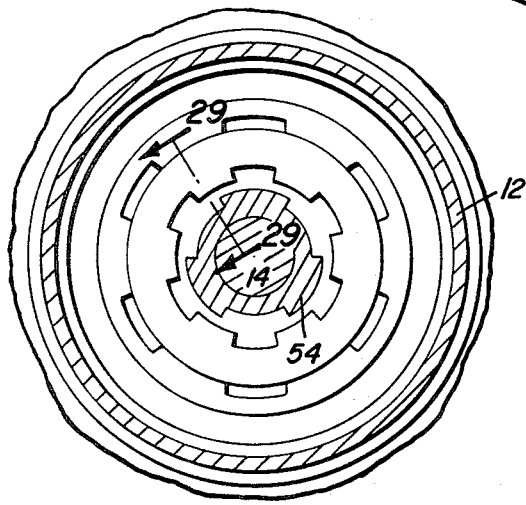

As more clearly seen in FIGURES 3 and 9, the cage 118 is provided with an internal beveled clutch engaging surface 158 adapted to be engaged by the engaging surface 84 of the clutch disk member for imparting clockwise rotation to the cage. With the brake roller in disengaged condition as hereinbefore referred to, a direct drive is established between the cage and the hub 12 when the hub is loaded and torque applied to the cage tends to rotate the cage in a clockwise direction relative to the hub. The cage is therefore provided with a plurality of circumferentially spaced recesses 158 within which pins 160 rotatably mount pawl elements 162 so as to form part of a one-way clutch assembly. Accordingly, the confronting portion of the driven hub 12 is provided with a plurality of pawl engaging notches 164 adapted to be engaged by the pawls 162 which are biased in a clockwise direction as viewed in FIGURE 9 by spring element 166 coiled about the pivot pin 160 and respectively bearing against the bottom of the cage recess 158 and the bottom of the pawl element 162. It will therefore be apparent, that forward driving torque applied to the cage 118 will be directly transferred by the pawl elements 162 to the hub to thereby lock up the planetary drive assembly so as to cause clockwise rotation of the sun gear 136 therewith. It will therefore be appreciated, that clockwise rotation of the sun gear 136 will ordinarily be prevented by the brake roller 140 held in brake engaging wedge position in the axle recess 142 under loaded conditions of the hub. On the other hand, should the hub become unloaded due to some down grade for example, tending to produce clockwise rotation of the hub at a greater speed than the cage driven by forward pedaling, the one-way clutch pawls will overrun. Under these conditions, with the ring gear 134 being rotated at a more rapid speed than the cage 118, rotation may be imparted to the sun gear 136 in a counter-clockwise direction which would urge the brake rollers 140 out of wedge position to permit coasting.

Speed responsive release mechanism

Rotatably mounted on the stationary axle 14 by means of a sleeve bearing 168, is a governor plate member 170 spaced in axial relation to the brake release control sleeve 148 by means of the thrust element 172 secured by the setscrew 174 to the stationary axle, as more clearly seen in FIGURES 3 and 16. Fixed to one axial end of the governor plate 170, is a driven sun gear element 176 that meshes with the gear element 178 of a compound planet gear assembly which also includes a planet pinion 180. The compound planet gear assembly is therefore rotatably mounted by the journal pin 182 secured to the end plate member 74 of the driven hub 12. The bearing member 46 mounted on the stationary axle 14 includes an inner axial end to which a reaction sun gear 184 is connected and meshes with the planet pinion 180. It will therefore be apparent, that an overdrive planetary gear train will be established between the driven hub and the governor plate member 170 so as to transfer a reduced torque to the governor member 170 in response to rotation imparted to the driven hub. Also, it will be apparent in view of the relative diameters of the reaction sun gear 184 and the driven sun gear 176 and the relative diameters of the planet pinion 180 and planet gear 178, that the governor member 170 will be driven in a reverse direction and at a higher speed than the driven hub.

Rotatably mounted on the member 170, is a control disk member 186 to which a pair of links 188 are connected by pins 190 as more clearly seen in FIGURES 3 and 6. The links 188 thus pivotally connect the control disk 186 to the free ends of a pair of centrifugal flyweight elements 192 pivotally mounted on the governor member 170 by means of pivot pins 194. It will therefore be apparent, that as the governor member 170 is rotated at an increasing speed, the centrifugal weight element 192 will pivot radially outwardly so as to angularly displace the control disk member 186 with respect to the member 170 on which it is mounted. Thus, with the centrifugal weight elements 192 disposed in the position illustrated in FIGURE 6, the control disk 186 will occupy one angular position with respect to the centrifugal member 170, whereas the control disk will occupy a second angular position with respect to the rotating governor member 170 when the centrifugal weight elements 192 are pivotally displaced outwardly as shown in FIGURE 15.

A clamping coil element formed by a plastic covered wire 196 is wound about the external surface of the control sleeve 148 in a contracted condition for frictional gripping thereof. One end of the clamp element 196 is therefore anchored to the governor member 170 and the other end to the control disk 186 in one of its angular positions as illustrated in FIGURE 6. Accordingly, projecting axially from the governor member 170 is an anchor pin 198 to which one end of the clamp element 196 is connected, the anchor pin being secured to the governor member by the setscrew 200 as seen in FIGURE 3. The other end of the clamping coil element 196 is anchored to the control disk 186 by the anchor pin 202 projecting therefrom. Therefore, it will be apparent, that upon reverse rotation (counter-clockwise as viewed in FIGURES 6 and 7) being imparted to the governor member 170 by the overdrive gearing connection 180–178–176–184 to the driven hub 12, the clamping coil element 196 will contract and impart a counter-clockwise torque on the control sleeve 148 and the brake disk engaging ring 144 as viewed in FIGURE 8 in order to prevent engagement of the brake element 140. The planetary drive assembly will therefore be held in its direct drive release condition regardless of the loading on the driven hub. When a preselected speed of the hub is attained, the centrifugal flyweights 192 on the governor member 170 will pivot outwardly so as to angularly displace the control disk 186 with respect to the governor member and thereby expand the clamping coil element 196 as illustrated in FIGURE 15. With the clamping coil element thereby expanded, the control sleeve 148 is released. When the sleeve 148 and ring 144 connected thereto by fingers 146 are released, the spring 152 urges it in a clockwise direction as viewed in FIGURE 17 to position the brake element 140 in the wedging position shown, in order to condition the planetary drive assembly for overdrive between the cage and the driven hub. Driving torque applied to the cage through the clutch disk will thereafter drive the driven hub at an overdrive ratio or high speed ratio as compared to the lower direct drive speed ratio hereinbefore described. It will therefore be appreciated, that the point at which the planetary drive assembly is released for overdrive will depend upon the speed at which the centrifugal flyweights 192 are pivotally displaced by centrifugal force.

Referring now to FIGURES 3, 7 and 19, it will be observed that the centrifugal flyweights have anchored thereto, spring elements 204 and 206 as more clearly seen in FIGURE 7. The spring elements are respectively tensioned through cable 208 extending from the spring element 204 around the pin 208 and wound upon the tension adjusting pin 210, the other end of the cable being connected to the other spring 206. Accordingly, by rotation of the winding pin 210 to which the spring cable is connected, the tension applied to the spring elements 204 and 206 may be increased or decreased, said spring element resisting the centrifugal forces which tend to pivotally displace the centrifugal flyweights 192. Thus, the speed at which the centrifugal flyweights will be displaced may be predetermined by the angular setting of the tension winding element which is rotatably mounted in the centrifugal member 170. Connected to the winding element 210 within an exposed circular recess 212 in the member 170, is a socket portion 214 adapted to receive the inner axial end of an adjusting element 216 which is non-circular in cross section so as to engage the socket 214 for imparting rotationable displacement to the winding control element 210. As more clearly seen in FIGURES 19 and 27, the element 216 is slidably mounted by means of a threaded plug 218 in the end cover member 74 for axial displacement into the socket 214 when aligned with the element 216. A snap ring 220 is seated within a recess 222 formed in the element 216 so as to prevent axial disassembly thereof when in its retracted position as illustrated in FIGURE 3. Connected to the outer axial end of the adjusting element 216 is a spring clip 224 adapted to frictionally bear against the end cover member 74 in order to provide an indication of the amount of angular displacement imparted to the winding element 210. It will also be appreciated, that a suitable indicator mark may be provided on the fixed bearing member 46 whereby the angular relationship between the driven hub and the fixed axle may be re-established corresponding to the aligned position between the elements 216 and the element 210 on the member 170 inasmuch as the member 170 is geared by the reverse gear assembly to the driven hub. It will therefore become apparent that by varying the tension on the spring elements 204 and 206 through the adjusting element 216 and the winding element 210 on the governor member 170, the speed at which the speed responsive release mechanism 42 will permit the planetary drive assembly to establish an overdrive, may be preselected or varied. The range of variation will therefore permit establishment of an overdrive condition in the planetary drive assembly under all drive conditions or a direct drive for all drive conditions. This will require either relieving the spring elements 204 and 206 so that the flyweights will be immediately displaced by centrifugal force as soon as the hub begins to rotate or to so tension the springs 204 and 206 so that the centrifugal weights will never be displaced in order to always hold the brake roller in its inoperative position.

*Operation*

Figure 13:
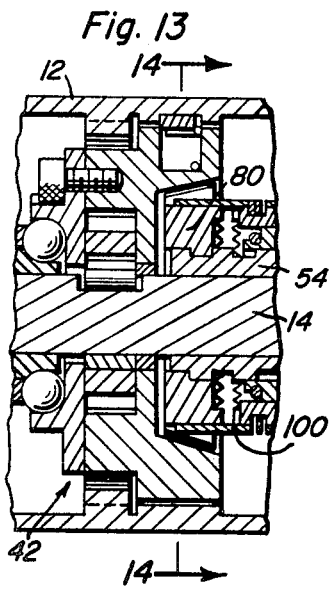
FIGURE 13 is a partial transverse sectional view of the driving gear train portion of the transmission in a direct drive condition.
Figure 14:
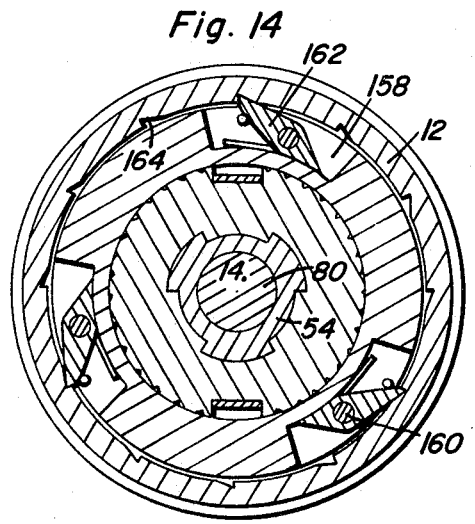
FIGURE 14 is a transverse sectional view taken substantially through a plane indicated by section line 14—14 of FIGURE 13.

From the foregoing description, the operational attributes of the change speed transmission will become evident. In FIGURE 3, the transmission is shown in a neutral or coasting condition in which the driven hub 12 is rotating clockwise or in a forward direction as viewed from the right axial end and the pedals are held stationary so as to hold the input sprocket assembly 26 stationary. Under these conditions, the clutch disk member 80 will be displaced in an axial direction out of clutch engagement with the planetary cage 118 from the position illustrated in FIGURE 13 wherein it is in engagement therewith for imparting torque thereto. Rotation of the clutch disk member 80 will then be retarded or brought to a standstill so that the retarding spring element 108 mounted thereon will yieldably engage the projections 116 while the planetary cage 118 is still rotating in a clockwise direction relative to the clutch disk member as shown in FIGURE 12 so as to thereby also retard rotation of the planetary cage. The hub 12 may then overrun the input planetary cage as shown in FIGURE 9. Under these conditions, rotation will be imparted to the sun gear 136 in a counter-clockwise direction tending to displace the brake roller 140 out of its wedge condition so that whenever the bicycle rider stops pedaling for coasting purposes, the reverse rotation of the sun gear will assist down shifting operation should the transmission be in the high speed or overdrive ratio.

Should the bicycle rider thereafter desire to apply the brakes, reverse rotation of the input sprocket assembly 26 will be assisted by the reversely rotating condition of the sun gear despite the forward rotating condition of the hub and will cause axial movement to be imparted to the clutch disk so as to cause movement thereof into the position illustrated in FIGURE 20 thereby deforming the retarding spring 108 so that it is no longer in the path of the planetary gear projections 116 as shown in FIGURE 28. The clutch disk will then engage the brake actuator member 90 through the clutch teeth 86 and 88 so as to stack the brake disks 72 and retard rotation of the hub 12. Inasmuch as the previously referred to reverse rotation of the sun gear 136 tends to displace the brake roller to its disengaged position, more rapid down shift of the transmission to the direct or low speed ratio condition occurs so that coast braking by the brake disks 72 will occur only under the more favorable gearless drive condition so as to require less mechanical advantage for brake disk engagement through the back-pedaling sprocket chain drive.

With the tension on the spring elements which bias the centrifugal weights 192, adjusted through the adjusting element 216, the releasable one-way brake roller 140 will be displaced to and held in the release position by the spring clamped control sleeve 148 as soon as the hub is driven in a clockwise direction through the clutch disk 80 so the one-way clutch pawl 162 can then directly transfer the rotative torque to the hub. The speed responsive release mechanism 42 will thereafter hold the planetary drive assembly 40 in the direct drive condition with the releasable brake roller 140 inoperative despite the relative load conditions on the driven hub as compared to the driving torque on the input cage 118. However, when a preselected speed of the hub is exceeded, the brake roller 140 will be dispaced by the ring 144 into the cam groove 138 of the reaction sun gear 136 when it becomes aligned with the axle slot 142, so as to thereafter hold the sun gear stationary to transmit driving torque to the hub without interruption but at a higher drive ratio. Down shift to the lower direct drive will occur when the speed drops below the preselected value, this being accomplished upon temporary removal of driving torque by the bicycle driver from the pedals so as to relieve the wedging pressure on the brake roller in order to permit the ring 144 to be displaced by the roller and the sun gear in a reverse direction against the bias of spring 152. Stoppage of the brake pedals for positive coasting on the other hand, would directly reverse the rotation of the sun gear as hereinbefore indicated so as to positively assist the down shift displacement of the brake roller by the ring to the release position.

From the foregoing description, the operation and utility of the transmission will be apparent. It will therefore be appreciated, that automatic ratio changes may be effected at any adjusted speed and under input torque conditions as prescribed by the rider pedaling. A more smoothly and easily operated change speed transmission is thereby provided which also embodies facilities for assisting the back pedaling coast braking operation and a a positive, dependable shift locking action.

The foregoing is considered as illustrative only of the principles of the invention. Further, since numerous modifications and changes will readily occur to those skilled in the art, it is not desired to limit the invention to the exact construction and operation shown and described, and accordingly all falling within the scope of the invention as claimed.

What is claimed as new is as follows:

1. An automatic variable speed transmission for bicycles or the like having a driven hub rotatably mounted on a stationary axle which also carries a drive sprocket assembly, and a back-pedaling coaster brake for the hub comprising, plural speed gear means drivingly connected to said hub, torque responsive means operatively connecting said sprocket assembly to the plural speed gear means in one direction only for driving said hub at a low and high drive ratio, speed responsive means operatively connected to the hub for preventing establishment of said high drive ratio below a predetermined speed condition of the hub to maintain said low drive ratio, and drive ratio control means operatively connected to the speed responsive means to condition the plural speed gear means for operation at said low drive ratio in response to removal or reversal of driving torque on the sprocket gear assembly, whereby drive may be resumed at the low drive ratio when the speed of the hub declines below said predetermined speed condition.

2. An automatic variable speed transmission for bicycles or the like having a driven hub rotatably mounted on a stationary axle which also carries a drive sprocket assembly, and a back pedaling coaster brake for the hub comprising plural speed gear means drivingly connected to said hub, torque responsive means operatively connecting said sprocket assembly to the plural speed gear means in one direction only for driving said hub at a low and high drive ratio, speed responsive means operatively connected to the hub for preventing establishment of said high drive ratio below a predetermined speed condition of the hub to maintain said low drive ratio, and drive ratio control means operatively connected to the speed responsive means to condition the plural speed gear means for operation at said low drive ratio in response to removal or reversal of driving torque on the sprocket gear assembly, said plural speed gear means comprising, a planetary gear assembly having a plurality of operatively interengaging elements including an input element, an output element connected to the hub and a reaction element, releasable brake means engageable with said reaction element for establishing said high drive ratio and one-way clutch means operatively coupling two of said elements for establishing said low drive ratio.

3. The combination of claim 2, including retarding means operatively connected to the torque responsive means and engageable with the plural speed gear means in response to approach in speed of the sprocket assembly toward standstill to assist said drive ratio control means in effecting a down shift whereby drive may be resumed at the low drive ratio when the speed of the hub declines below said predetermined speed condition.

4. The combination of claim 3, wherein said torque responsive means comprises, clutch disk means drivingly connected to the sprocket assembly for engagement with the plural speed gear means in response to forward rotation of the sprocket assembly to impart torque either directly to the hub or at a torque reduction ratio.

5. The combination of claim 4, wherein said speed responsive means comprises, centrifugal means rotatable relative to the hub at all speeds thereof, revering gear means drivingly connecting said hub to the centrifugal means at an overdrive ratio to impose a reduced driving torque thereon, clamp means operatively connected to the drive ratio control means and the centrifugal means for release in response to rotation of the hub above a preselected speed and speed adjustment means displaceably mounted on the hub for engagement with centrifugal means for preselecting said speed above which the brake release means is angularly displaced.

6. The combination of claim 5, wherein said drive ratio control means comprises, brake release means operatively connected to the brake means and displaceable by the speed responsive means to render the brake means inoperative below said predetermined speed and biasing means operatively connected to said brake release means for restoring the brake means to an operative condition in response to release of the clamp means to permit up shift of the plural speed gear means from a direct drive condition to an overdrive ratio above said predetermined speed.

7. The combination of claim 6, wherein said retarding means includes, a coupling element mounted on the clutch disk means for rotation therewith, means mounting said coupling element for axial movement relative to the clutch disc means, retarding spring means mounted on the coupling element for displacement by the clutch disk means upon axial movement thereof from a drive imparting position in engagement with the plural drive gear means, and abutment means mounted on the plural speed gear means for yieldably engaging the retarding spring means only in the drive imparting position of the clutch disk means to retard relative rotation between the clutch disk means and an element of the plural speed gear means.

8. An automatic variable speed transmission for bicycles or the like having a driven hub rotatably mounted on a stationary axle which also carries a drive sprocket assembly, and a back pedaling coaster brake for the hub comprising plural speed gear means drivingly connected to said hub, torque responsive means operatively connecting said sprocket assembly to the plural speed gear means in one direction only for driving said hub at a low and high drive ratio, speed responsive means operatively connected to the hub for preventing establishment of said high drive ratio below a predetermined speed condition of the hub to maintain said low drive ratio, and drive ratio control means operatively connected to the speed responsive means to condition the plural speed gear means for operation at said low drive ratio in response to removal or reversal of driving torque on the sprocket gear assembly, said speed responsive means comprising, centrifugal means rotatable relative to the hub at all speeds thereof, reversing gear means drivingly connecting said hub to the centrifugal means at an overdrive ratio to impose a reduced driving torque thereon, brake release means operatively connected to the plural speed gear means and rotatably mounted on the centrifugal means for angular displacement in response to rotation of the hub above a preselected speed and speed adjustment means displaceably mounted on the hub for engagement with centrifugal means for preselecting said speed above which the brake release means is angularly displaced.

9. An automatic variable speed transmission for bicycles or the like having a driven hub rotatably mounted on a stationary axle which also carries a drive sprocket assembly, and a back pedaling coaster brake for the hub comprising plural speed gear means drivingly connected to said hub, torque responsive means operatively connecting said sprocket assembly to the plural speed gear means in one direction only for driving said hub at a low and high drive ratio, speed responsive means operatively connected to the hub for preventing establishment of said high drive ratio below a predetermined speed condition of the hub to maintain said low drive ratio, and drive ratio control means operatively connected to the speed responsive means to condition the plural speed gear means for operation at said low drive ratio in response to removal or reversal of driving torque on the sprocket gear assembly, said torque responsive means comprising, clutch disk means and means drivingly mounting the disk means on the sprocket assembly for axial movement into engagement with the plural speed gear means in response to forward rotation of the sprocket assembly.

10. The combination of claim 9, including retarding means operatively connected to the clutch disk means and engageable with the plural speed gear means in response to approach in speed of the sprocket assembly toward standstill.

11. The combination of claim 10, wherein said retarding means includes, a coupling element mounted on the clutch disk means for rotation therewith, retarding spring means mounted on the coupling element for displacement by the clutch disk means upon axial movement thereof from a drive imparting position in engagement with the plural drive gear means, and abutment means mounted on the plural speed gear means for yieldably engaging the retarding spring means only in the drive imparting position of the clutch disk means to retard relative rotation between the clutch disk means and an element of the plural speed gear means and thereby facilitate downshift of the gear means.

12. An automatic variable speed transmission for bicycles or the like having a driven hub rotatably mounted on a stationary axle which also carries a drive sprocket assembly, and a back-pedaling coaster brake for the hub comprising, plural speed gear means including, a cage, a planet gear pinion rotatably mounted on said cage, a gear element meshing with said planet pinion and connected to to hub and a reaction gear element mounted on the axle and meshing with the planet pinion, clutch disk means drivingly connected to the sprocket assembly for engagement with the cage in response to forward rotation of the sprocket assembly to impart torque without interruption either directly to the hub or at a torque reduction ratio, retarding means mounted on the clutch disk means and yieldably engageable with the cage to retard relative rotation between the cage and the clutch disk means in response to removal of driving torque from the sprocket assembly for inducing reverse rotation of the reaction gear element, releasable brake means for preventing forward rotation of the reaction gear element to establish an overdrive ratio and down shift means operatively connected to said releasable brake means for disengagement thereof in response to said removal of driving torque from the sprocket assembly.

13. The combination of claim 12, wherein said down shift means comprises, speed responsive release means operatively connected to the hub, and releasable clamp means operatively connected to the speed responsive means for holding the releasable brake means disengaged.

14. An automatic variable speed transmission for bicycles or the like having a driven hub rotatably mounted on a stationary axle which also carries a drive sprocket assembly, and a back-pedaling coaster brake for the hub comprising, plural speed drive means drivingly connecting the hub to the sprocket assembly for establishing a low and high speed ratio therebetween, drive control means operatively engageable with the drive means and operative in response to continuous forward driving torque on the sprocket assembly to establish said high speed ratio and said low speed ratio without torque interruption, speed responsive release means drivingly connecting the hub to the drive control means below a predetermined speed of the hub to hold the plural speed drive means in said low speed ratio, and means engageable with the plural speed drive means and responsive to removal of driving torque from the sprocket assembly to condition the plural speed drive means for change in speed ratio in one direction.

15. In an automatic plural speed transmission having a driven member, speed responsive mechanism for holding said transmission in a low speed ratio condition below a predetermined speed of the driven member comprising, centrifugal means rotatable relative to the driven member at all speeds thereof, reversing gear means drivingly connecting said driven member to the centrifugal means at an overdrive ratio to impose a reduced driving torque thereon, ratio control means rotatably mounted on the centrifugal means, means interconnecting the ratio control means with the centrifugal means for angular displacement relative thereto in response to rotation above a preselected speed of the driven member and speed adjustment means displaceably mounted on the driven member for engagement with centrifugal means for preselecting said speed above which the ratio control means is angularly displaced.

16. In a variable-ratio gear drive for a wheel hub, a fixed axle, a transmission member journaled on the axle, a driving member including a screw shaft rotatably mounted on the axle, variable speed gearing for rotating the wheel hub from the transmission member including an angularly shiftable speed change element, a driving clutch member threaded on the screw shaft, driven clutch means mounted on the transmission member in a position to engage the hub when rotated by the driving clutch member on forward rotation of the screw shaft, means for angularly shifting the change speed element responsive to a predetermined speed of the hub, and means for disengaging the driven clutch means in response to rotation of the hub by the variable speed gearing when the change speed element is angularly shifted.

17. The combination of claim 16 wherein said means for angularly shifting the change speed element comprises, a control sleeve engageable with said change speed element and rotatably mounted on the axle, spring means biasing said control sleeve to one drive position, a driven member journaled on the axle, fixed ratio gearing drivingly connecting the hub to the driven member, releasable clamp means connected to the driven member and engageable with the control sleeve to displace and hold the change speed element in another drive position below said predetermined speed of the hub, and speed responsive means mounted on the driven member and connected to the clamp means for release thereof above said predetermined speed of the hub to permit the spring means to angular shift said control sleeve and the change speed element to said one drive position.

18. A variable speed transmission comprising, a fixed axle, a driving member rotatably mounted on the axle, a screw shaft connected to the driving member, a clutch disc threadedly mounted on the screw shaft, a planetary gear assembly having a carrier journaled on the axle and rotatably mounting planet pinions in mesh with a reaction gear element and a driven gear member, clutch means mounted on the carrier including a clutch surface engageable by the clutch disc for transmitting torque to the carrier from the driving member and a one-way clutch engageable with the driven gear member for directly transmitting torque from the carrier to the driven gear member in one direction of rotation of the driving member, a retarding element mounted on the clutch disc and yieldably engageable by the carrier for retarding relative rotation between the carrier and the clutch disc when being disengaged by removal or reversal of torque on the driving member, a one-way brake element mounted on the axle and angularly shiftable between a release position and a brake position engageable with the reaction gear element to prevent rotation thereof in one direction, angularly displaceable drive control means rotatably mounted on the axle and engageable with the brake element for shifting thereof between said release and brake positions, spring means connected to the drive control means for urging the brake element to the brake position, a speed control member rotatably mounted on the axle, overdrive gearing drivingly connecting the driven gear member to the speed control member, releasable clamp means operatively connecting the speed control member to the drive control means for angularly shifting and holding the brake element in the release position against the bias of the spring means, and speed responsive means mounted on the speed control member and connected to the clamp means for releasing the drive control means above a predetermined speed of the driven gear member.

19. In combination with a planetary gear transmission having an input member, an output member and a reaction element drivingly interengaged with each other to establish a driving connection, one-way clutch means operatively connecting the input member to the output member for establishing a low speed drive ratio therebetween in response to rotation of the input member in a forward direction, releasable one-way brake means engageable with the reaction element to resist rotation thereof in one direction for establishing a high speed drive ratio between the input and output members causing the one-way clutch means to overrun, speed responsive means operatively connecting the output member to the releasable one-way brake means for preventing engagement thereof with the reaction element below a preselected speed of the output member to hold the planetary gear transmission in the low speed drive ratio condition, a reversible driving member, torque responsive clutch means operatively coupling the driving member with the input member in response to rotation of the driving member in said forward direction for transmitting said input torque thereto, and means responsive to disengagement of the torque responsive clutch means for retarding rotation of the input member relative to the driving member to effect rotation of the reaction element in a direction opposite to said one direction and thereby condition the transmission for change in the drive ratio from said high speed to said low speed drive ratio for coasting or braking purposes.

20. A multiple speed hub for a bicycle and the like comprising, in combination:
(a) an input member adapted to be connected to a source of motive power for rotation thereby about an axis;
(b) an output member rotatable about said axis;
(c) multiple-ratio transmission means interposed between said members for rotating said output member at one of the multiple transmission ratios of said transmission means responsive to rotation of said input member;
(d) rotatable centrifugal actuating means operatively connected to said transmission means for changing said one transmission ratio thereof to another one of said transmission ratios when the rotary speed of said actuating means exceeds a predetermined speed; and
(e) motion transmitting means interposed between said output member and said actuating means for rotating said actuating means at a rotary speed greater than the rotary speed of said output member, when said output member rotates.

21. A hub as set forth in claim 20, wherein said motion transmitting means include a set of meshing gear means.

22. A hub as set forth in claim 20, wherein said multiple ratio transmission means has a plurality of fixed predetermined transmission ratios, said predetermined transmission ratios including said one and said other one of said transmission ratios.

23. A multiple speed bicycle hub comprising, in combination:
(a) a shaft having an axis;
(b) a driver member mounted on said shaft for rotation about the axis thereof;
(c) a hub shell mounted on said shaft and rotatable about said axis;
(d) multiple-ratio transmission means mounted in said hub shell and interposed between said driver member and said hub shell for rotating said hub shell at one of the multiple transmission ratios of said transmission means responsive to rotation of said driver member;
(e) centrifugal actuating means rotatably mounted in said hub shell and operatively connected to said transmission means for changing said one transmission ratio thereof to another one of said transmission ratios when the rotary speed of said actuating means differs from a predetermined speed; and
(f) motion transmitting means in said hub shell and interposed between the same and said actuating means for rotating the latter at a speed higher than the speed of said hub shell when said hub shell rotates.

References Cited

UNITED STATES PATENTS

| 1,645,554 | 10/1927 | Taylor | 188—82.3 |
| 1,774,220 | 8/1930 | Anderson | 188—82.3 |
| 2,147,750 | 2/1939 | Neracher et al. | 74—752 |
| 2,796,775 | 6/1957 | Gleasman | 74—751 |
| 3,071,984 | 1/1963 | Milenkovic | 74—751 |
| 2,910,157 | 10/1959 | Gleasman | 74—752 X |
| 3,143,005 | 8/1964 | Schwerdhofer | 74—752 |
| 3,180,167 | 4/1965 | Paschakarnis | 74—752 X |
| 3,286,549 | 11/1966 | Schwerdhofer | 74—752 |
| 3,301,095 | 1/1967 | Dotter | 74—752 |

FOREIGN PATENTS

| 625,502 | 8/1961 | Canada. |
| 632,305 | 11/1949 | Great Britain. |

FRED C. MATTERN, JR., *Primary Examiner.*

DON A. WAITE, *Examiner.*

T. C. PERRY, *Assistant Examiner.*